(12) United States Patent
Bonneviot et al.

(10) Patent No.: US 6,544,353 B2
(45) Date of Patent: Apr. 8, 2003

(54) SURFACE CHEMICAL TREATMENT FOR LIQUID GALLIUM OR GALLIUM ALLOY MIRRORS

(75) Inventors: Laurent Bonneviot, Lyons (FR); Ermanno F. Borra, Québec (CA)

(73) Assignee: Universite Laval

( * ) Notice: Subject to any disclaimer, the term of this patent is extended or adjusted under 35 U.S.C. 154(b) by 0 days.

(21) Appl. No.: 09/993,349

(22) Filed: Nov. 19, 2001

(65) Prior Publication Data

US 2002/0062883 A1 May 30, 2002

Related U.S. Application Data

(60) Provisional application No. 60/249,881, filed on Nov. 20, 2000.

(51) Int. Cl.$^7$ .............................. C23C 22/70
(52) U.S. Cl. .................. 148/242; 148/248; 148/272; 148/274; 148/277; 148/276; 427/329
(58) Field of Search .................. 148/242, 248, 148/272, 274, 277, 276, 280; 427/329

(56) References Cited

U.S. PATENT DOCUMENTS

| 3,497,377 A | 2/1970 | Allingham | 117/35 |
| 5,508,003 A | 4/1996 | Rancourt et al. | 420/555 |
| 5,792,236 A | 8/1998 | Taylor et al. | 75/715 |

OTHER PUBLICATIONS

Patent Abstracts of Japan, vol. 014, No. 383 (E–0966), Aug. 17, 1990.

*Primary Examiner*—John Sheehan
*Assistant Examiner*—Andrew L. Oltmans
(74) *Attorney, Agent, or Firm*—Sidley Austin Brown & Wood LLP

(57) ABSTRACT

The invention relates to a method of treating a liquid gallium or gallium alloy surface for prolonged use as a liquid mirror. The method of the invention comprises the steps of (a) contacting the surface of liquid gallium or gallium alloy with an aqueous solution of a halogenic acid to cause dissolution of any gallium oxide present on the surface, thereby obtaining an oxide-free liquid gallium or gallium alloy surface covered with a layer of the acid solution; (b) adding to the acid solution an aqueous solution of a surfactant present in an amount to form a single bimolecular layer of surfactant at an interface between the liquid gallium or gallium alloy and water; and (c) allowing a uniform passivating oxide layer to gradually form on the oxide-free liquid gallium or gallium alloy surface, the passivating oxide layer having surface irregularities smaller than 40 nm.

28 Claims, No Drawings

SURFACE CHEMICAL TREATMENT FOR LIQUID GALLIUM OR GALLIUM ALLOY MIRRORS

This application claims benefit of provisional application No. 60/249,881 filed Nov. 20, 2000.

BACKGROUND OF THE INVENTION

The present invention pertains to improvements in the field of liquid mirrors. More particularly, the invention relates to a method of treating a liquid gallium or gallium alloy surface for prolonged use as a liquid mirror.

Liquid mirrors are alternative solutions to solid metal-coated glass mirrors in optical instruments such as telescopes. They are based on the principle that the surface of a liquid metal rotating in a gravitational field takes the shape of a parabola, providing excellent reflective surface qualities at low costs. For a given diameter, the cost of a mercury liquid mirror is almost two orders of magnitude less than the cost of a glass mirror. However, mercury liquid mirrors suffer from a major limitation: they cannot be tilted and can only observe the zenith, thus greatly restricting their usefulness. In addition, mercury is a toxic substance.

Gallium and gallium alloys such as gallium-indium alloys have been used as non-toxic substitutes for mercury in liquid mirrors. They have the advantage of remaining in the liquid phase throughout a wide temperature range and have a very low vapor pressure at atmospheric pressure. However, a problem still remains in that there is a drastic oxidation which takes place at the gallium-air interface. A gallic oxide phase, $Ga_2O_3$, grows rapidly and produces a rough surface with large defects that diffracts light and destroys the reflection properties of the gallium or gallium alloy. The surface becomes rapidly matte. Since the mirror is normally used in air, and therefore in the presence of water and oxygen, the oxidation of gallium is unavoidable.

SUMMARY OF THE INVENTION

It is therefore an object of the present invention to overcome the above drawback and to provide a method of treating a liquid gallium or gallium alloy surface for prolonged use as a liquid mirror.

In accordance with the present invention, there is thus provided a method of treating a liquid gallium or gallium alloy surface, which comprises the steps of:

a) contacting the surface of liquid gallium or gallium alloy with an aqueous solution of a halogenic acid to cause dissolution of any gallium oxide present on the surface, thereby obtaining an oxide-free liquid gallium or gallium alloy surface covered with a layer of the acid solution;

b) adding to the acid solution an aqueous solution of a surfactant present in an amount to form a single bimolecular layer of surfactant at an interface between the liquid gallium or gallium alloy and water; and c) allowing a uniform passivating oxide layer to form on the oxide-free liquid gallium or gallium alloy surface, the passivating oxide layer having surface irregularities smaller than 40 nm.

Applicants have found quite unexpectedly that by forming on an oxide-free liquid gallium or gallium alloy surface a uniform passivating oxide layer having surface irregularities smaller than 40 nm, such a passivating oxide layer protects the liquid gallium or gallium alloy surface against undesirable oxidation and maintains the reflection properties of the surface for a long period of time. A passivating oxide layer having surface irregularities larger than 40 nm adversely affect the reflection properties of the passivated surface. The formation of a single bimolecular layer of surfactant at the metal-water interface in step (b) permits formation of the desired passivating oxide layer in step (c).

DESCRIPTION OF PREFERRED EMBODIMENTS

The first step is essentially a cleaning step. Examples of suitable halogenic acids which may be used in step (a) for cleaning the liquid gallium or gallium alloy surface and causing dissolution of any gallium oxide present on the surface include hydrochloric and hydrobromic acids. The aqueous solution of halogenic acid generally comprises the halogenic acid in a concentration of about 0.1 to about 5 M, preferably about 2 M. The resulting oxide-free liquid gallium or gallium alloy surface has a mirror like aspect and possesses the reflectivity required for optical purposes. If one does not proceed with step (b), re-oxidation will occur, although the oxide phase producing a matte surface does not develop until all of the halogenic acid has been consumed. Usually, the quantity of halogenic acid used is large enough to provide a clean or oxide-free surface for about one hour so that there is no urge to proceed with the second step. Since the layer of acid solution covering the oxide-free liquid gallium or gallium alloy surface generally has a thickness greater than 1 mm, it is preferably reduced to a thickness of about 1 mm prior to step (b), in order to avoid having to wait too long for the desired passivating oxide layer to form.

The surfactant used in step (b) can be a non-ionic, cationic or anionic surfactant. Examples of suitable non-ionic surfactants include long chain alcohols and amines having an alkyl chain with 10 to 30 carbon atoms, such as hexadecylalcohol and hexadecylamine. It is also possible to use secondary amine of formula RR'NH in which R is an alkyl group having 10 to 30 carbon atoms, preferably 16 to 20 carbon atoms, and R' is an alkyl group having 1 to 8 carbon atoms, a cycloalkyl group, a phenyl group or a benzyl group. These secondary amines may require a co-solvent such as an alcohol for increasing their solubility in water.

Ionic surfactants are preferably used in step (b). Examples of suitable cationic surfactants include quaternary ammonium and phosphonium salts having an alkyl chain with 10 to 30 carbon atoms, such as the quaternary ammonium salts of formula $R_1R_2R_3R_4NX$ and the quaternary phosphonium salts of formula $R_1R_2R_3R_4NX$, in which $R_1$ is an alkyl group having 10 to 30 carbon atoms, preferably 16 to 20 carbon atoms, $R_2$ is an alkyl group having 1 to 30 carbon atoms, $R_3$ and R4 are alkyl groups each having 1 to 5 carbon atoms, and X is a halogen atom, preferably a chlorine or bromine atom. Hexadecyltrimethylammonium chloride or bromide and hexadecyltrimethylphosphonium chloride or bromide are particularly preferred. Examples of suitable anionic surfactants, on the other hand, include long chain carboxylates, alkylphosphates and alkylsulfonates having an alkyl chain with 10 to 30 carbon atoms, such as the carboxylates of formula RCOOM, the alkylphosphates of formula $RPO_4M_2$ and the alkylsulfonates of formula $RSO_3M$, in which R is an alkyl group having 10 to 30 carbon atoms, preferably 16 to 20 carbon atoms, and M is an alkali metal, preferably sodium.

The aqueous solution of surfactant used in step (b) generally comprises the surfactant in a concentration of about $10^{-4}$ to about $10^{-8}$, preferably about $10^{-6}$ M.

The thickness of the bimolecular layer of surfactant formed at the metal-water interface is roughly twice the length of the surfactant molecule and is controlled by the length of the alkyl chain. Typically, the thickness ranges from 2 to 5 nm and is about 3 nm for an alkyl chain having 16 carbon atoms. This bimolecular layer of surfactant uniformly covers the oxide-free liquid gallium or gallium alloy surface. Oxidizing water, protons and oxygen are present at the interface between the metal and the amphiphilic heads of the surfactant molecules. Therefore, oxidation still proceeds. However, the diffusion of the oxidizing components is restricted and controlled by the surfactant layer. As a result, an oxide phase forms slowly and develops as a skin-like layer that passivates the surface and maintains a high mirror type of reflectivity. The surface irregularities of the passivating oxide layer formed in step (c) are preferably smaller than 20 nm. Such a passivating oxide layer is destroyed by acidic attack as described above in respect of step (a). Therefore, steps (a) and (b) can be repeated a second time when the quality of the mirror is not yet satisfactory.

In order to prevent undesirable liquid displacements over the passivated liquid gallium or gallium alloy surface when the mirror rotates, excess solution covering the passivated surface is removed to provide thereon a layer of solution having a thickness of about 0.5 to about 3 mm. The solution is pumped out carefully to avoid any mechanical contact with the metal surface so as to avoid puckering the passivating oxide layer. This treatment as well as the other treatments described above are performed on a flat fixed mirror or a rotating parabolic mirror since no mechanical contact with the liquid mirror is required.

We claim:

1. A method of treating a liquid gallium or gallium alloy surface for prolonged use as a liquid mirror, comprising the steps of:
   a) contacting the surface of liquid gallium or gallium alloy with an aqueous solution of a halogenic acid to cause dissolution of any gallium oxide present on said surface, thereby obtaining an oxide-free liquid gallium or gallium alloy surface covered with a layer of the acid solution;
   b) adding to said acid solution an aqueous solution of a surfactant present in an amount to form a single bimolecular layer of surfactant at an interface between the liquid gallium or gallium alloy and water from one or more of said acid solution and said surfactant solution; and
   c) allowing a uniform passivating oxide layer to gradually form on the oxide-free liquid gallium or gallium alloy surface, said passivating oxide layer having surface irregularities smaller than 40 nm.

2. A method as claimed in claim 1, wherein said halogenic acid is hydrochloric or hydrobromic acid.

3. A method as claimed in claim 1, wherein said aqueous solution of halogenic acid comprises said halogenic acid in a concentration of about 0.1 to about 5 M.

4. A method as claimed in claim 3, wherein said concentration is about 2 M.

5. A method as claimed in claim 1, wherein in step (a) the layer of acid solution covering the oxide-free liquid gallium or gallium alloy surface has a thickness greater than 1 mm and wherein, prior to step (b), said layer of acid solution is reduced to a thickness of about 1 mm.

6. A method as claimed in claim 1, wherein said surfactant is a non-ionic surfactant selected from the group consisting of long chain alcohols and amines having an alkyl chain with 10 to 30 carbon atoms.

7. A method as claimed in claim 6, wherein said non-ionic surfactant is selected from the group consisting of hexadecylalcohol and hexadecylamine.

8. A method as claimed in claim 1, wherein said non-ionic surfactant is a secondary amine of formula RR'NH in which R is an alkyl group having 10 to 30 carbon atoms and R' is an alkyl group having 1 to 8 carbon atoms, a cycloalkyl group, a phenyl group or a benzyl group.

9. A method as claimed in claim 8, wherein said non-ionic surfactant is a secondary amine of the formula RR'NH in which R is an alkyl group having 16 to 20 carbon atoms and R' has the aforesaid meaning.

10. A method as claimed in claim 1, wherein said surfactant is a cationic surfactant selected from the group consisting of quaternary ammonium and phosphonium salts having an alkyl chain with 10 to 30 carbon atoms.

11. A method as claimed in claim 10, wherein said cationic surfactant is a quaternary ammonium salt of formula $R_1R_2R_3R_4NX$ in which $R_1$ is an alkyl group having 10 to 30 carbon atoms, $R_2$ is an alkyl group having 1 to 30 carbon atoms, $R_3$ and $R_4$ are alkyl groups each having 1 to 5 carbon atoms, and X is a halogen atom.

12. A method as claimed in claim 11, wherein said cationic surfactant is a quaternary ammonium salt of the formula $R_1R_2R_3R_4NX$ in which $R_1$ is an alkyl group having 16 to 20 carbon atoms, $R_2$, $R_3$ and $R_4$ are alkyl groups each having 1 to 3 carbon atoms, and X is a chlorine or bromine atom.

13. A method as claimed in claim 12, wherein said quaternary ammonium salt is hexadecyltrimethylammonium chloride or bromide.

14. A method as claimed in claim 10, wherein said cationic surfactant is a quaternary phosphonium salt of formula $R_1R_2R_3R_4PX$ in which $R_1$ is an alkyl group having 10 to 30 carbon atoms, $R_2$ is an alkyl group having 1 to 30 carbon atoms, $R_3$ and $R_4$ are alkyl groups each having 1 to 5 carbon atoms, and X is a halogen atom.

15. A method as claimed in claim 14, wherein said cationic surfactant is a quaternary phosphonium salt oft he formula $R_1R_2R_3R_4PX$ in which $R_1$ is an alkyl group having 16 to 20 carbon atoms, $R_2$, $R_3$ and $R_4$ are alkyl groups each having 1 to 3 carbon atoms, and X is a chlorine or bromine atom.

16. A method as claimed in claim 15, wherein said quaternary phosphonium salt is hexadecyltrimethylphosphonium chloride or bromide.

17. A method as claimed in claim 1, wherein said surfactant is an anionic surfactant selected from the group consisting of long chain carboxylates, alkylphosphates and alkylsulfonates having an alkyl chain with 10 to 30 carbon atoms.

18. A method as claimed in claim 17, wherein said anionic surfactant is a carboxylate of formula RCOOM in which R is an alkyl group having 10 to 30 carbon atoms and M is an alkali metal.

19. A method as claimed in claim 18, wherein said anionic surfactant is a carboxylate of the formula RCOOM in which R is an alkyl group having 16 to 20 carbon atoms and M is sodium.

20. A method as claimed in claim 17, wherein said anionic surfactant is an alkylphosphate of formula $RPO_4M_2$ in which R is an alkyl group having 10 to 30 carbon atoms and M is an alkali metal.

21. A method as claimed in claim 20, wherein said anionic surfactant is an alkylphosphate of the formula $RPO_4M_2$ in which R is an alkyl group having 16 to 20 carbon atoms and M is sodium.

22. A method as claimed in claim 17, wherein said anionic surfactant is an alkylsulfonate of formula $RSO_3M$ in which R is an alkyl group having 10 to 30 carbon atoms and M is an alkali metal.

23. A method as claimed in claim 22, wherein said anionic surfactant is an alkylsulfonate of the formula $RSO_3M$ in which R is an alkyl group having 16 to 20 carbon atoms and M is sodium.

24. A method as claimed in claim 1, wherein said aqueous solution of surfactant comprises said surfactant in a concentration of about $10^{-4}$ to about $10^{-8}$ M.

25. A method as claimed in claim 24, wherein said concentration is about $10^{-6}$ M.

26. A method as claimed in claim 1, wherein said bimolecular layer of surfactant has a thickness of about 2 to about 5 nm.

27. A method as claimed in claim 1, further including the steps of removing after step (c) excess solution covering the passivated liquid gallium or gallium alloy surface to provide thereon a layer of solution having a thickness of about 0.5 to about 3 mm.

28. A method as claimed in claim 1, wherein the passivating oxide layer formed in step (c) has surface irregularities smaller than 20 nm.

* * * * *